(12) United States Patent
Seo et al.

(10) Patent No.: US 9,425,488 B2
(45) Date of Patent: Aug. 23, 2016

(54) APPARATUS FOR PREVENTING OVERCHARGING OF BATTERY AND BATTERY COMPRISING THE APPARATUS

(71) Applicant: Hyundai Motor Company, Seoul (KR)

(72) Inventors: Jeong Hun Seo, Gyeonggi-Do (KR); Yeon Man Jeong, Gyeonggi-Do (KR); Yoon Cheol Jeon, Gyeonggi-Do (KR); Hae Kyu Lim, Gyeonggi-Do (KR); Jun Seok Choi, Gyeonggi-Do (KR); Yong Jin Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 277 days.

(21) Appl. No.: 14/334,149

(22) Filed: Jul. 17, 2014

(65) Prior Publication Data

US 2015/0111089 A1    Apr. 23, 2015

(30) Foreign Application Priority Data

Oct. 22, 2013   (KR) .......................... 10-2013-0126156

(51) Int. Cl.
*H01M 10/42* (2006.01)
*H01M 2/10* (2006.01)
*H01M 2/34* (2006.01)

(52) U.S. Cl.
CPC ........ *H01M 10/4207* (2013.01); *H01M 2/1061* (2013.01); *H01M 2/345* (2013.01); *H01M 2200/20* (2013.01)

(58) Field of Classification Search
CPC ............ H01M 10/4207; H01M 2/345; H01M 2/1061; H01M 2200/20
See application file for complete search history.

(56) References Cited

U.S. PATENT DOCUMENTS

| | | | |
|---|---|---|---|
| 2006/0267545 A1* | 11/2006 | Lee ..................... | H01M 2/1061 320/106 |
| 2008/0241671 A1* | 10/2008 | Cherng ................ | H01M 2/021 429/163 |
| 2011/0039147 A1* | 2/2011 | Cheon .................. | H01M 2/206 429/159 |
| 2011/0274955 A1* | 11/2011 | Park .................... | H01M 2/0212 429/94 |
| 2012/0040235 A1* | 2/2012 | Cho .................... | H01M 2/0207 429/156 |
| 2013/0075242 A1* | 3/2013 | Lim ...................... | H01M 2/34 200/52 R |
| 2014/0050954 A1* | 2/2014 | Kim ..................... | H01M 2/30 429/90 |

FOREIGN PATENT DOCUMENTS

| | | |
|---|---|---|
| JP | 2009-076265 A | 4/2009 |
| JP | 2011-070871 A | 4/2011 |

(Continued)

*Primary Examiner* — Muhammad Siddiquee
(74) *Attorney, Agent, or Firm* — Mintz Levin Cohn Ferris Glovsky and Popeo, P.C.; Peter F. Corless (57) ABSTRACT

An apparatus preventing overcharging of a battery and a battery including the apparatus are provided. The apparatus includes holders interposed on respective gaps between battery cells to be stacked and an installation space formed between borders of adjacent holders. A cutting module is inserted into the installation space and an inserted end thereof is disposed between the cells adjacent to an inner side of the installation space to be fixed to a holder and an exposed end thereof has a cutter blade directed to a gap between a lead tap and a bus bar bonded together that is formed. The gap between the ends is connected with a plurality of hinges to compress the hinges to be unfolded when the cell is expanded in a side direction and to deploy the exposed end outwardly for the cutter blade to separate the bonding of the lead tap and the bus bar.

15 Claims, 7 Drawing Sheets

(56) References Cited

FOREIGN PATENT DOCUMENTS

| | | |
|---|---|---|
| JP | 2012-119183 A | 6/2012 |
| KR | 10-2003-0044510 | 6/2003 |
| KR | 10-2005-0075687 | 7/2005 |
| KR | 10-2009-0131573 | 12/2009 |
| KR | 10-2010-0099983 | 9/2010 |
| KR | 10-2013-0017289 A | 2/2013 |
| KR | 10-2013-0099875 A | 9/2013 |

* cited by examiner

APPARATUS FOR PREVENTING OVERCHARGING OF BATTERY AND BATTERY COMPRISING THE APPARATUS

CROSS-REFERENCE(S) TO RELATED APPLICATION

The present application claims priority of Korean Patent Application Number 10-2013-0126156 filed on Oct. 22, 2013, the entire contents of which is incorporated herein for all purposes by this reference.

BACKGROUND (a) Technical Field

The present disclosure relates to an apparatus for preventing overcharging of a battery and a battery comprising the apparatus that disconnects a charging circuit by sensing the swelling even in a minimal amount of gas generation.

(b) Background Art

Generally, an overcharging safety device is mounted within a high voltage battery system. The overcharging safety device is designed to prevent an outbreak of fire by cutting off the flow of electric current and hindering thermal runaway therethrough when an overcharge occurs in the battery system. The mechanism of an overcharging safety structure of a conventional passive type uses expansion force generated during swelling of a cell. When the swelling of the cell is sufficiently generated, a cell tap is ruptured through a cell expansion induced by an opening of an end plate, thereby cutting off electric current to ensure safety of the high voltage battery system.

However, in this structure, the swelling of the cell has to be sufficiently generated before an occurrence of thermal runaway, and when the swelling of the cell is insufficiently generated before the occurrence of thermal runaway, the swelling of the cell will occur simultaneously with the thermal runaway, and thus, even when an electrical current is cut off, a fire may outbreak due to the thermal runaway. Additionally, when the amount of gas generation is not sufficiently maintained when the specification of a cell is changed, a design change of the battery system is required due to the variation of cell expansion force. That is, it may be difficult to dynamically ensure a safety structure which is sensitive to the specification of a cell. Further, even for a safety structure of an active type, which blocks a relay actively, an overcharging safety structure of a passive type is required since it may be difficult to ensure safety when the relay is fused to fail.

The technology according to an exemplary embodiment of the present invention relates to an overcharging safety structure of a passive type, and it uses a minimal amount of gas generation. In other words, the technology relates to an overcharging safety structure for cutting off an electrical current in an early stage through the cell expansion force with a minimal amount of gas generation. The overcharging safety structure of a conventional passive type uses an expansion force in a direction of a battery surface which is generated when a cell swells. When the swelling of the cell swelling is sufficiently generated, a cell is deformed at an endplate opening and a welding point of a cell tap portion and a bus bar is ruptured through the deformation of the cell, thereby ensuring safety by cutting off an electrical current through the rupture of welding point/cell tap portion.

However, the swelling of the cell has to be sufficiently generated before an occurrence of thermal runaway under this structure since when the swelling of the cell is insufficiently generated in a direction of a battery surface before an occurrence of the thermal runaway, the swelling of the cell may occur simultaneously with the thermal runaway. Thus, even when an electrical current is cut off, a fire may outbreak due to the thermal runaway. Additionally, when the specification of a cell is changed, a design change of the battery system is required due to the variation of cell expansion force.

A sensor or switch configured to sense the cell expansion is arranged on the safety structure of a conventional active type and the power of a relay is to be cut off when the cell expansion is sensed, thus cutting off current flow of a battery system. However, a technology for cutting off the power of a relay cannot be applied to the case where the relay is fused to fail. Accordingly, it may be difficult to ensure safety when an emergency situation such as an accident, beyond operation of a sensor or switch, failure of electron components or the like occurs simultaneously together with the swell expansion according to an overcharging safety structure of an active type.

Further, according to a related art a space for allowing the surface expansion of a cell has to be prepared and thus a space for a package is increased, causing unfavorable an energy density per volume. The description provided above as a related art of the present invention is merely for helping understanding the background of the present invention and should not be construed as being included in the related art known by those skilled in the art.

SUMMARY

The present invention provides an apparatus configured to prevent overcharging of a battery and a battery comprising the apparatus so that swelling may be sensed more accurately and a charging circuit may be disconnected even in a minimal amount of gas generation.

An apparatus for preventing overcharging of a battery according to the present invention may include: a plurality of holders interposed on respective gaps between stacked battery cells; an installation space formed between borders of adjacent holders; and a cutting module inserted into the installation space, wherein the inserted end of the cutting module is disposed between the cells adjacent to an inner side of the installation space to be fixed to a holder and the exposed end of the cutting module forms a cutter blade directed to a gap between a lead tap and a bus bar that are bonded together wherein the gap between the inserted end and the exposed end is connected with a plurality of hinges to compress the hinge to be unfolded when the cell is expanded to a side direction and thus the exposed end may be deployed outwardly (e.g., pushed out) for the cutter blade to separate the bonding of the lead tap and the bus bar.

The holder may be shaped as a frame that encloses the cell wherein the adjacent cells pass through the holders to be in face-contact each other (e.g., to face each other). The installation spaces may be formed on side ends of the adjacent holders, respectively, to face each other and form one space when the holders are assembled. A hinge axis may be provided on one end of the cutting module to be connected to the inner end of the installation space. The battery cell may be expanded to a side direction when it swells and enters into the installation space to compress the hinge. The plurality of hinges of the cutting module may be disposed on the installation space while they are folded. A notch may be formed at one end of the cutting module toward the cell and the notch may be fitted between the adjacent cells. An aperture may be formed at the cutting module, and a protrusion protruding to pass through the aperture and then be in contact with the facing holder may be formed at the holder, to ensure a width of the installation space. A plurality of hinges of the cutting module may be a series of hinges that are connected consecutively with a plurality of hinge axis and may be arranged at the installation space while folded in a zigzag shape. The plurality of hinges of the cutting module may be formed in a diamond shape where hinge axes are disposed at each apex between the ends of the cutting module.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
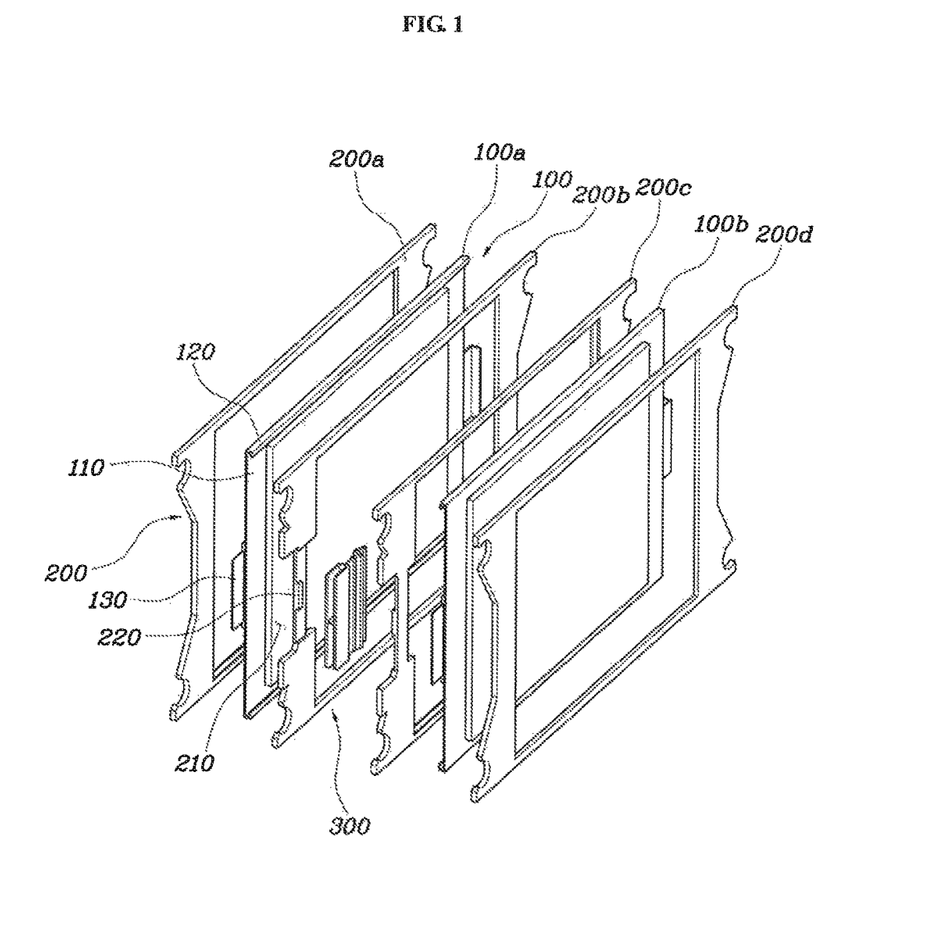
FIG. 1 is an exemplary detailed view of a battery according to an exemplary embodiment of the present invention.
Figure 3:
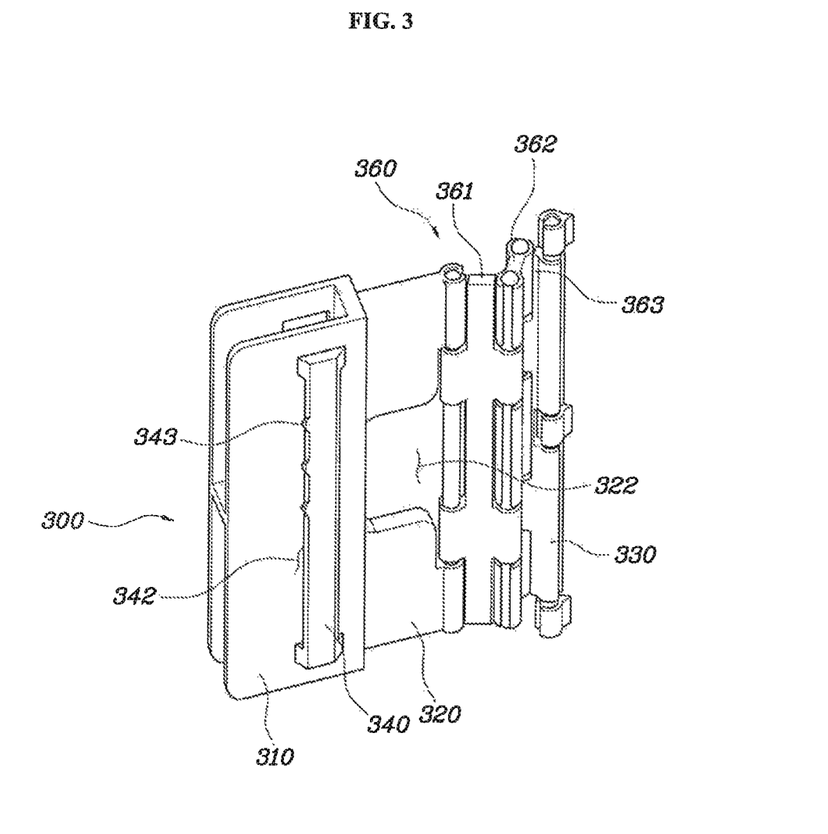
FIG. 3 is an exemplary sectional view of an apparatus that prevents overcharging of a battery according to an exemplary embodiment of the present invention.
Figure 4:
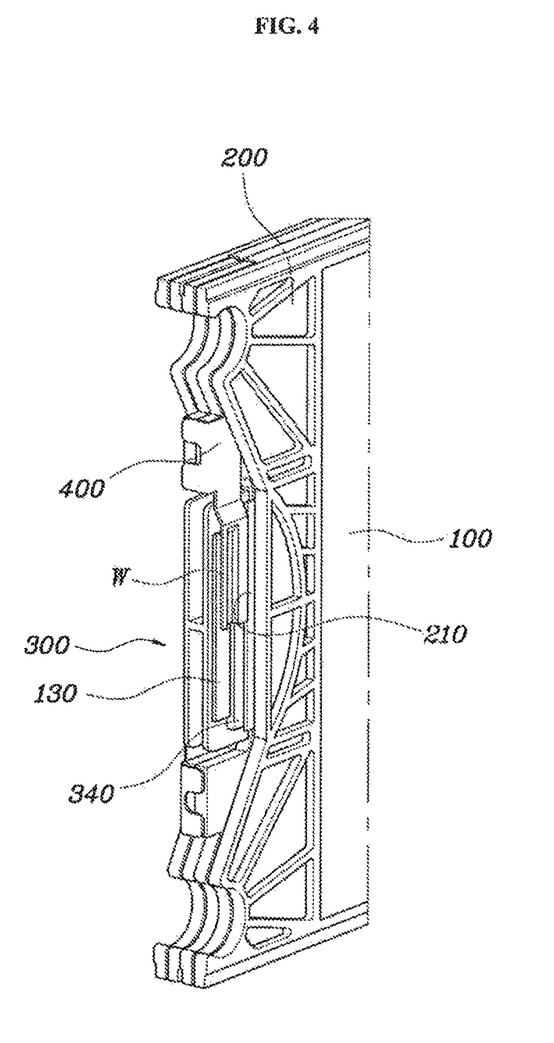
FIG. 4 is an exemplary view of a battery according to an exemplary embodiment of the present invention.
Figure 5:
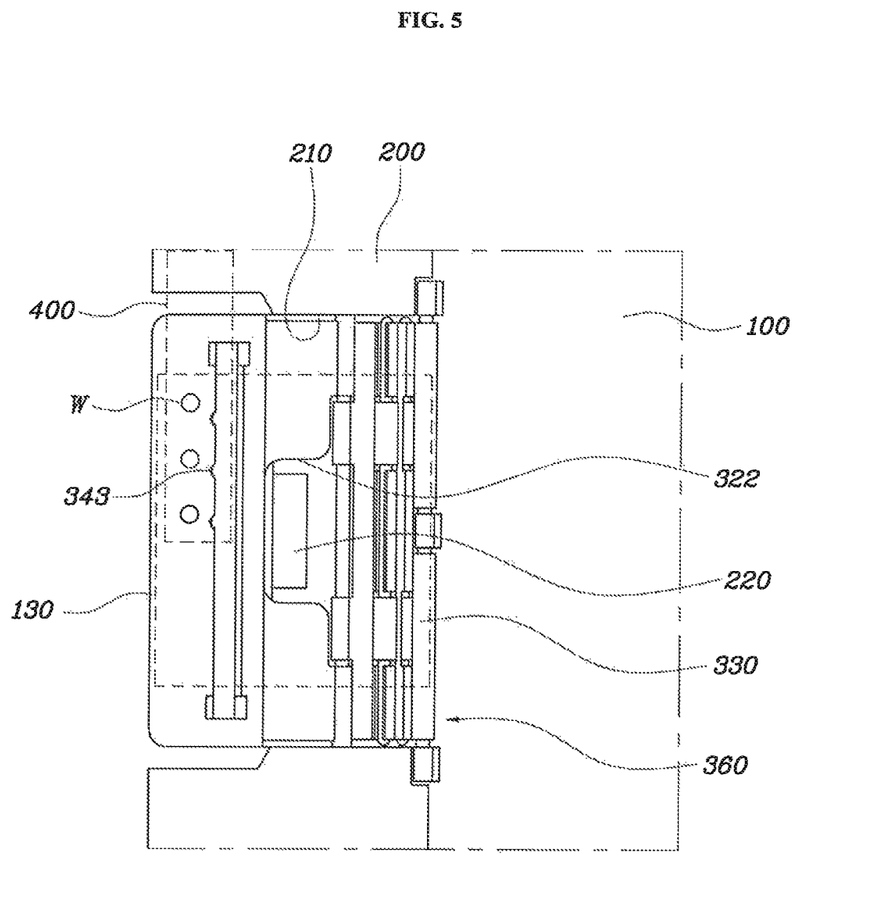
FIG. 5 is an exemplary side view of a battery according to an exemplary embodiment of the present invention.
Figure 6:
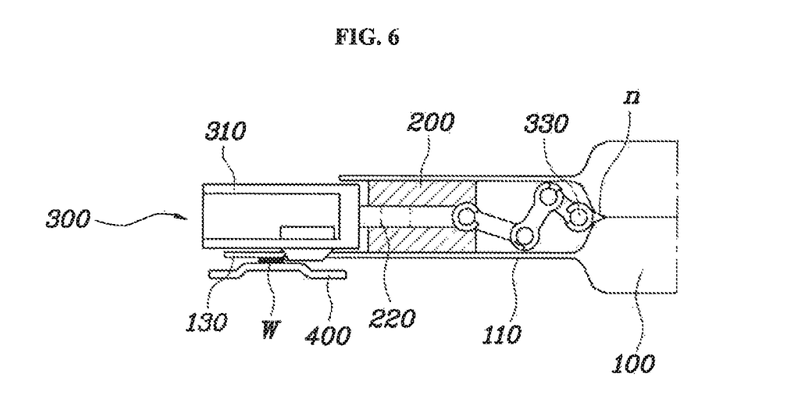
FIG. 6 is an exemplary sectional view of an apparatus that prevents overcharging of a battery according to an exemplary embodiment of the present invention.
Figure 7:
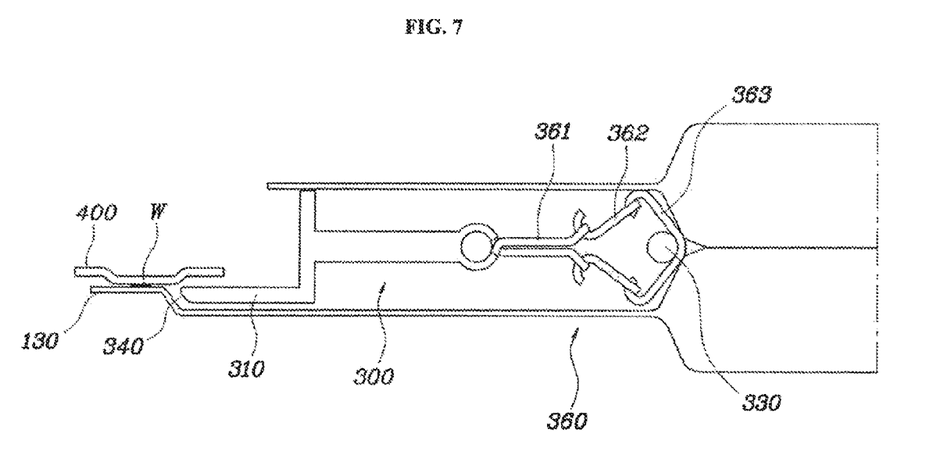
FIG. 7 is an exemplary sectional view of an apparatus that prevents overcharging of a battery according to another exemplary embodiment of the present invention.

Hereinafter, an apparatus for preventing overcharging of a battery and a battery comprising the apparatus according to an exemplary embodiment of the present invention will be explained in detail referring to the accompanying drawings. FIG. 1 is an exemplary detailed view of a battery according to an exemplary embodiment of the present invention, FIG. 2 is an exemplary sectional view of a battery according to an exemplary embodiment of the present invention, FIG. 3 is an exemplary view of an apparatus for preventing overcharging of a battery according to an exemplary embodiment of the present invention, FIG. 4 is an exemplary view of a battery according to an exemplary embodiment of the present invention, FIG. 5 is an exemplary side view of a battery according to an exemplary embodiment of the present invention, FIG. 6 is an exemplary sectional view of an apparatus for preventing overcharging of a battery according to an exemplary embodiment of the present invention, and FIG. 7 is an exemplary sectional view of an apparatus for preventing overcharging of a battery according to another exemplary embodiment of the present invention.

Figure 2:
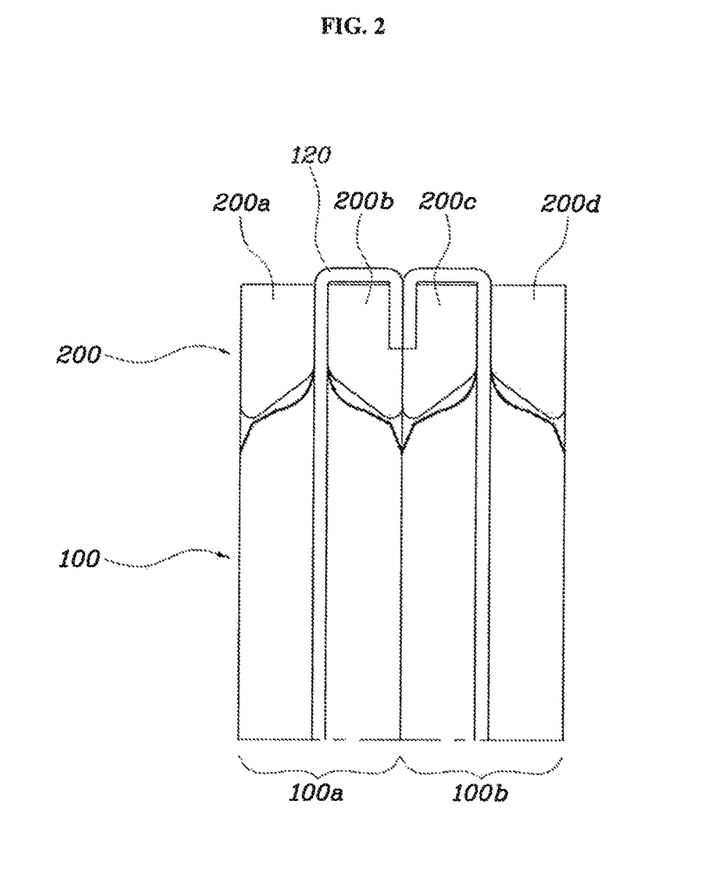
FIG. 2 is an exemplary sectional view of a battery according to an exemplary embodiment of the present invention.

Referring to FIGS. 1 and 2, the battery may include an apparatus that prevents overcharging of a battery of the present invention, including: a plurality of battery cells 100a, 100b in face-contact (e.g., face each other) and stacked; a plurality of holders 200a, 200b, 200c, 200d interposed on respective gaps between the battery cells 100a, 100b to be stacked; an installation space 210 formed between borders of adjacent holders 200b, 200c; a lead tap 130 extended from the cell 100 and exposed to the exterior through the installation space 210; a bus bar 400 that may form a contact point together with the lead tap 130; and a cutting module 300 inserted into the installation space 210 wherein an inserted end 330 of the cutting module 300 is disposed between the cells 100 adjacent to the inner side of the installation space 210 to be fixed to a holder 200 and an exposed end 310 of the cutting module 300 having a cutter blade 340 directed to a gap between the lead tap 130 and the bus bar 400 that are bonded together may be formed wherein the gap between the inserted end 330 and the exposed end 310 may be connected with a plurality of hinges 361, 362, 363 to compress the hinge 360 to be unfolded when the cell 100 is expanded to a side direction and thus the exposed end 310 may be deployed outwardly (e.g., pushed out) for the cutter blade to separate the bonding of the lead tap 130 and the bus bar 400.

In other words, a battery according to an exemplary embodiment of the present invention may be designed for an apparatus that prevents overcharging to be combined with the battery for a vehicle, wherein a plurality of battery cells 100a, 100b that may be in face-contact and stacked and the holders 200 interposed on the respective gaps between the battery cells 100 of a battery to be stacked may be provided. Additionally, the battery cell 100 may be wrapped with a pouch 110 and the pouch 110 may extend to the exterior of the cell, and the holder 200 may be shaped as a frame that encloses the cell 100 wherein the adjacent cells 100a, 100b may pass through the holders 200 to be in face-contact each other and the adjacent holders 200a, 200b, 200c, 200d may be compressed, leaving the extended portion of the pouch 110 therebetween.

Further, the adjacent holders 200 may be compressed toward each other while the extended end of the pouch 110 is folded to wrap one end of the adjacent holder 200. Meanwhile, the cell 100 and the holder 200 may be connected to be overlapped and then compressed at both sides thereof through an end plate to be fastened, thereby inhibiting at a maximum level the expansion of the cells in a surface direction. The border portions may be blocked firmly by the holder 200, to allow the cell to be expanded into the installation space wherein an apparatus for preventing overcharging of a battery is arranged, thus preventing overcharging of a battery even in a minimal amount of swelling.

Moreover, FIG. 3 is an exemplary view of an apparatus that prevents overcharging of a battery according to an exemplary embodiment of the present invention and the apparatus that prevents overcharging of a battery may include: a plurality of holders 200a, 200b, 200c, 200d interposed on the respective gaps between battery cells 100a, 100b to be stacked; an installation space 210 formed between borders of adjacent holders 200b, 200c; and a cutting module 300 inserted into the installation space wherein an inserted end of the cutting module 300 is disposed between the cells 100a, 100b adjacent to an inner side of the installation space to be fixed to a holder 200 and an exposed end of the cutting module 300 may have a cutter blade 340 directed to a gap between the lead tap 130 and the bus bar 400 bonded together may be formed wherein the gap between the inserted end 330 and the exposed end 310 may be connected with a plurality of hinges 361, 362, 363 to compress the hinge 360 to be unfolded when the cell 100 is expanded to a side direction and thus the exposed end 310 may be deployed outwardly for the cutter blade to separate the bonding of the lead tap 130 and the bus bar 400.

In other words, the apparatus that prevents overcharging of a battery according to an exemplary embodiment of the present invention may include an installation space 210 formed between borders of the adjacent holders 200b, 200c. In particular, the installation space 210 may be formed at a position extended extraneous to the cell 100 to be exposed, where a lead tap 130 may be disposed, and shaped to be caved between opposed holders 200b, 200c at that position. The holder 200 may be shaped as a frame that encloses the cell 100, and the adjacent cells 100a, 100b may pass through the holders 200a, 200b, 200c, 200d to be in surface-contact, respectively, and the installation space 210 may be formed at side ends of the adjacent holders 200b, 200c to be faced, respectively, and may form a space when the holder 200 is assembled. Through this configuration, the holder 200 may restrict the expansion by maintaining a compressive force, but allowing the expansion of the cell 100 to the installation space 210.

Meanwhile, the cutting module 300 may be inserted into the installation space 210 wherein an inserted end 330 of the cutting module 300 may be disposed between the adjacent cells 100a, 100b at the inner side of the installation space 210 and fixed to the holder 200. In particular, a cutter blade 340 may be formed at the exposed end 310 of the cutting module 300 towards a gap between the lead tap 130 and the bus bar 400 that may be bonded together. Further, a gap formed between the inserted end 330 and the exposed end 310 of the cutting module 300 may be connected with a plurality of hinges 361, 362, 363 to compress the hinges 360 to be unfolded when the cell 100 is expanded in aside direction at the installation space 210, and as a result the exposed end 310 of the cutting module 300 may be deployed (e.g., pushed) to an outer side such that the cutter blade 340 may separate the bonding of the lead tap 130 and the bus bar 400.

In other words, a plurality of hinges 361, 362, 363 of cutting module 300 may be arranged at the installation space 210 while being folded. In particular, the battery cell 100 may be expanded laterally when the battery cell 100 swells to enter into the installation space to compress the hinge 360. Accordingly, the lead tap 130 and the bus bar 400 may be insulated through a mechanical structure by the pressure of the cell 100 which is expanded sensitively. Therefore, the apparatus that prevents overcharging of a battery according to the present invention may be safer than an electrical active type, sensitivity thereof may be improved and performance thereof may be more uniform compared to a conventional passive type.

Moreover, a hinge axis that may be connected to the inner end of the installation space 210 may be disposed at the inserted end 330 of the cutting module 300. Additionally, a notch n may be formed at the inserted end 330 of the cutting module 300 toward the cell 100 and the notch n may be fitted between the adjacent cells 100a, 100b. Accordingly, the cells 100a, 100b disposed at both sides to face each other based on the notch n may be expanded independently to pressurize the hinge 360, and the hinge axis may be fixed to the holder 200 at the inner side of the installation surface 210, and the location of the inserted end 330 of the cutting module 300 may be fixed between the facing cells 100a, 100b by the notch n. Accordingly, even when the cell 100 is expanded, the inserted end 330 of the cutting module 300 may be fixed, and a plurality of hinges 361, 362, 363 and the exposed end 310 of the cutting module 300 may be deployed relatively.

FIG. 6 is an exemplary sectional view of an apparatus that prevents overcharging of a battery according to an exemplary embodiment of the present invention wherein a aperture 322 may be formed at the cutting module 300, and a protrusion 220 that protrudes to pass through the aperture 322 and then be in contact with the holder 200c facing the holder 200c, may be formed at the holder 200b, to maintain a width of the installation space 210. In other words, the protrusion 220 may be formed on the facing holder 200b at the installation space and the protrusion 220 may be supported on the holder 200c to be faced while passing through the aperture 322 in the substantial center of the cutting module 300 such that the installation space 210 may maintain a predetermined space to deploy the hinge 360 to prevent a situation where the hinge 360 is compressed not to be deployed even when the cell 100 is expanded since the compressing force in a surface direction of a battery is substantial during assembly of a battery.

Additionally, a plurality of hinges 361, 362, 363 of the cutting module 300 may be a series of hinges 360 connected consecutively with a plurality of hinge axis and may be arranged at the installation space 210 while folded in a zigzag shape. Accordingly, the soldering of the lead tap 130 and the bus bar 400 may form a contact point while the hinges are folded in a zigzag shape and the soldering point w is to be ruptured while the hinges 360 and cutting module 300 are deployed when the cell 100 is expanded.

Meanwhile, FIG. 7 is an exemplary sectional view of an apparatus that prevents overcharging of a battery according to another exemplary embodiment of the present invention wherein a plurality of hinges 361, 362, 363 of the cutting module 300 may be formed in a diamond shape where hinge axes may be disposed at each apex between an inserted end 330 and an exposed end 310 of the cutting module 300. In particular, the hinges may be folded to maintain the shape of a diamond, and the hinges may be unfolded to lengthen the shape of a diamond when the cell 100 is expanded to cause the cutting module 300 to rupture the soldering point w.

Further, as shown in FIG. 5, the lead tap 130 and the bus bar 400 may be bonded via a plurality of isolated soldering points w. Additionally, catching protrusions 343 may be formed at the locations of the cutter blade 340, respectively, corresponding to the points between the respective soldering points w to insert the catching protrusion 343 into the point between the soldering points w when the cutting module 300 is deployed. In other words, the soldering point w may be ruptured more easily through this configuration when the cutter blade 340 and the soldering point w are matched more accurately. According to the apparatus that prevents overcharging of a battery and a battery as described above, a swelling of battery may be sensed more accurately and a charging circuit may be cut off even in a minimal amount of gas generation.

Meanwhile, according to the apparatus that prevents overcharging of a battery of the present invention, a package space for a battery may be reduced to design a more compact module, compared to a related art in which a package space has to be ensured to allow the expansion in a surface direction when operating the apparatus. An energy density per volume of a battery system may be increased, thereby increasing commerciality of a vehicle. Additionally, the volume of a module may be decreased to reduce the volume of the whole package of a battery and the size of instrument for installing the package. Further, an aluminum cover arranged between cells required in a conventional module design may be omitted, thus saving a cost for molding the cover and material thereof. In addition, a high pressure for expanding the cells may be induced with a minimal amount of gas generation, and thereby operating the apparatus at an earlier stage to cut off current, compared to a conventional apparatus that requires much a substantial amount of gas generation.

Although the present invention was described with reference to exemplary embodiments shown in the drawings, it is apparent to those skilled in the art that the present invention may be changed and modified in various ways without departing from the scope of the present invention, which is described in the following claims.

What is claimed is:

1. An apparatus for preventing overcharging of a battery comprising:
   a plurality of holders interposed on respective gaps between battery cells to be stacked;
   an installation space formed between borders of adjacent holders; and
   a cutting module inserted into the installation space and an inserted end of the cutting module is disposed between the cells adjacent to the inner side of the installation space to be fixed to a holder and an exposed end of the cutting module has a cutter blade directed to a gap between a lead tap and a bus bar bonded together that is formed,
   wherein the gap between the inserted end and the exposed end is connected with a plurality of hinges to compress the hinges to be unfolded when the cell is expanded in a side direction and to deploy the exposed end outwardly for the cutter blade to separate the bonding of the lead tap and the bus bar.

2. The apparatus for preventing overcharging of a battery of claim 1, wherein the holder is shaped as a frame that encloses the cell and the adjacent cells pass through the holders to be in face-contact with each other.

3. The apparatus for preventing overcharging of a battery of claim 1, wherein the installation spaces are formed on side ends of the adjacent holders, respectively, to face each other and form one space when the holders are assembled.

4. The apparatus for preventing overcharging of a battery of claim 1, wherein a hinge axis is disposed on the inserted end of the cutting module to be connected to an inner end of the installation space.

5. The apparatus for preventing overcharging of a battery of claim 1, wherein the battery cell is expanded in a side direction when the battery cell swells and enters into the installation space to compress the hinges.

6. The apparatus for preventing overcharging of a battery of claim 1, wherein the plurality of hinges are disposed on the installation space while they are folded.

7. The apparatus for preventing overcharging of a battery of claim 1, further comprising:
   a notch formed at the inserted end of the cutting module toward the cell fitted between the adjacent cells.

8. The apparatus for preventing overcharging of a battery of claim 1, further comprising:
   an aperture formed at the cutting module; and
   a protrusion that protrudes to pass through the aperture to be in contact with the facing holder is formed at the holder.

9. The apparatus for preventing overcharging of a battery of claim 1, wherein the plurality of hinges of the cutting module are a series of hinges connected consecutively with a plurality of hinge axis and are arranged at the installation space while folded in a zigzag shape.

10. The apparatus for preventing overcharging of a battery of claim 1, wherein the plurality of hinges of the cutting module are funned in a diamond shape where hinge axis are disposed at each apex between the inserted end and the exposed end of the cutting module.

11. A battery provided with an apparatus for preventing overcharging thereof, comprising:
    a plurality of battery cells in face-contact and stacked;
    a plurality of holders interposed on respective gaps between the battery cells to be stacked;
    an installation space formed between borders of adjacent holders;
    a lead tap extended from the cell and exposed extraneously through the installation space;
    a bus bar that forms a contact point together with the lead tap; and
    a cutting module which is inserted into the installation space and an inserted end of the cutting module is disposed between the cells adjacent to the inner side of the installation space to be fixed to a holder and an exposed end of the cutting module has a cutter blade directed to a gap between the lead tap and the bus bar bonded together that is formed,
    wherein the gap between the inserted end and the exposed end is connected with a plurality of hinges to compress the hinges to be unfolded when the cell is expanded to a side direction and deploy the exposed end outwardly for the cutter blade to separate the bonding of the lead tap and the bus bar.

12. The battery provided with an apparatus for preventing overcharging thereof of claim 11, wherein the lead tap and the bus bar are bonded via a plurality of spaced soldering points.

13. The battery provided with an apparatus for preventing overcharging thereof of claim 12, further comprising:
    a plurality of catching protrusions formed at the locations of the cutter blade respectively, corresponding to the points between the respective soldering points to insert the catching protrusion into the point between the soldering points when the cutting module is deployed.

14. The battery provided with an apparatus for preventing overcharging thereof of claim 11, wherein the battery cell is wrapped with a pouch and the pouch is extended to the exterior of the cell, and the holder is shaped as a frame that encloses the cell, wherein the adjacent cells pass through the holders to be in surface-contact each other and the adjacent holders are compressed, leaving the extended portion of the pouch between the adjacent holders.

15. The battery provided with an apparatus for preventing overcharging thereof of claim 14, wherein the adjacent holders are compressed while the extended portion of the pouch is folded to enclose one end of the adjacent holder.

* * * * *